(12) United States Patent
Yonekubo et al.

(10) Patent No.: US 10,495,888 B2
(45) Date of Patent: Dec. 3, 2019

(54) IMAGE DISPLAY DEVICE CAPABLE OF ADJUSTING IMAGE POSITION IN DEPTH DIRECTION

(71) Applicant: SEIKO EPSON CORPORATION, Tokyo (JP)

(72) Inventors: Masatoshi Yonekubo, Hara-mura (JP); Mitsutaka Ide, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 57 days.

(21) Appl. No.: 15/557,073

(22) PCT Filed: Feb. 1, 2016

(86) PCT No.: PCT/JP2016/000496
§ 371 (c)(1),
(2) Date: Sep. 8, 2017

(87) PCT Pub. No.: WO2016/143245
PCT Pub. Date: Sep. 15, 2016

(65) Prior Publication Data
US 2018/0067326 A1 Mar. 8, 2018

(30) Foreign Application Priority Data
Mar. 9, 2015 (JP) .................. 2015-045901

(51) Int. Cl.
*G02B 27/02* (2006.01)
*G02B 5/09* (2006.01)
(Continued)

(52) U.S. Cl.
CPC ............ *G02B 27/026* (2013.01); *G02B 5/09* (2013.01); *G02B 5/10* (2013.01); *G02B 13/0035* (2013.01);
(Continued)

(58) Field of Classification Search
None
See application file for complete search history.

(56) References Cited

U.S. PATENT DOCUMENTS

2006/0119539 A1   6/2006 Kato et al.
2012/0069448 A1   3/2012 Sugihara et al.
(Continued)

FOREIGN PATENT DOCUMENTS

JP   2004-021078 A   1/2004
JP   2004-233906 A   8/2004
(Continued)

OTHER PUBLICATIONS

Apr. 26, 2016 International Search Report issued in International Patent Application No. PCT/JP2016/000496.

*Primary Examiner* — Jennifer D. Carruth
(74) *Attorney, Agent, or Firm* — Oliff PLC

(57) ABSTRACT

An image display device is capable of easily adjusting a diopter scale with respect to a virtual image. The image display device includes an image generating unit that emits image light including image information, a first optical system that forms an intermediate image by condensing the image light, a second optical system that guides a virtual image to eyes of a viewer by deflecting the light from the intermediate image, and guides the light to the eyes of the viewer by transmitting external light, and an intermediate image position changing device that adjusts a position of the virtual image in depth direction by changing a position of the intermediate image.

14 Claims, 5 Drawing Sheets

(51) Int. Cl.
*G02B 5/10* (2006.01)
*G02B 13/00* (2006.01)
*G02B 17/08* (2006.01)
*G02B 27/01* (2006.01)
*G02B 27/06* (2006.01)

(52) U.S. Cl.
CPC ......... *G02B 17/08* (2013.01); *G02B 27/0172* (2013.01); *G02B 27/06* (2013.01); *G02B 27/028* (2013.01); *G02B 2027/0154* (2013.01); *G02B 2027/0174* (2013.01); *G02B 2027/0178* (2013.01)

(56) References Cited

U.S. PATENT DOCUMENTS

| | | | |
|---|---|---|---|
| 2012/0162549 A1* | 6/2012 | Gao | G02B 27/0172 349/11 |
| 2013/0222896 A1* | 8/2013 | Komatsu | G02B 17/0848 359/365 |
| 2013/0235440 A1 | 9/2013 | Takeda et al. | |
| 2014/0049833 A1* | 2/2014 | Totani | G02B 27/0172 359/633 |
| 2015/0061975 A1* | 3/2015 | Komatsu | G02B 27/0172 345/8 |
| 2015/0062697 A1* | 3/2015 | Komatsu | G02B 5/30 359/365 |
| 2015/0062716 A1* | 3/2015 | Komatsu | G02B 27/0172 359/630 |

FOREIGN PATENT DOCUMENTS

| | | |
|---|---|---|
| JP | 2006-153967 A | 6/2006 |
| JP | 2012-063627 A | 3/2012 |
| JP | 2013-186230 A | 9/2013 |
| JP | 2013-191905 A | 9/2013 |
| WO | 2004/001484 A1 | 12/2003 |

* cited by examiner

IMAGE DISPLAY DEVICE CAPABLE OF ADJUSTING IMAGE POSITION IN DEPTH DIRECTION

TECHNICAL FIELD

The present disclosure relates to an image display device.

BACKGROUND ART

In recent years, a wearable type image display device such as a head mounted display has attracted attention. As such a head mounted display, a see-through type device with which it is possible to visually recognize both a video (virtual image) from a display element and an image (external light) of outdoor scenes at the same time has been known (for example, refer to PTL 1).

In such a see-through type image display device, even if a wearer having a near-sightedness, long-sightedness, or the like, visibility of the external light is increased by performing diopter adjustment of the external light.

CITATION LIST

Patent Literature

PTL 1: Japanese Unexamined Patent Application Publication No. 2013-186230

SUMMARY OF INVENTION

Technical Problem

In a case in which a wearer having a near-sightedness, long-sightedness, or the like uses a see-through type image display device, diopter adjustment (adjustment of position of depth direction of virtual image) with respect to a virtual image is also required to be performed. However, in the related art described above, the diopter adjustment with respect to the virtual image is not considered. Therefore, a new technique capable of easily performing the diopter adjustment with respect to the virtual image is desired to be provided.

The embodiment has been made in terms of such a circumstance described above, and is to provide an image display device capable of easily adjusting a diopter scale with respect to the virtual image.

Solution to Problem

According to a first aspect of the embodiment, there is provided an image display device including an image generating unit that emits image light including image information, a first optical system that forms an intermediate image by condensing the image light, a second optical system that guides a virtual image to eye of a viewer by deflecting the light from the intermediate image, and guides the light to the eye of the viewer by transmitting external light, and intermediate image position changing means that adjusts a position of the virtual image in a depth direction by changing a position of the intermediate image.

According to the image display device of the first aspect, it is possible to perform the diopter adjustment with respect to the virtual image through a simple configuration in which the position of the intermediate image is changed.

In the first aspect described above, the image generating unit may include a light scanning device which scans light emitted from a light source unit, and a expanding element which expands the light from the light scanning device and emits the light as the image light, and the intermediate image position changing means may move at least a part of the first optical system in a direction of a central light beam of the image light.

According to the configuration, the image generating unit is miniaturized. In addition, since the intermediate image position changing means moves at least a part of the first optical system, a configuration of the device is simplified and miniaturized. Accordingly, the entire device can be miniaturized.

In the first aspect described above, the image generating unit may include an electro-optical device which generates the image light, and the intermediate image position changing means may move at least a part of the first optical system in the direction of the central light beam of the image light.

According to the configuration, since the intermediate image position changing means moves at least a part of the first optical system, the configuration of the device is simplified and miniaturized. Accordingly, the entire device can be miniaturized.

According to a second aspect of the embodiment, there is provided an image display device including an image generating unit that emits image light including image information, a first optical system that forms an intermediate image by condensing the image light, a second optical system that guides a virtual image to eye of a viewer by deflecting the light from the intermediate image, and guides the light to the eye of the viewer by transmitting external light, diopter scale adjusting means that adjusts a diopter scale with respect to the external light; and intermediate image position changing means that adjusts a position of the virtual image in a depth direction by changing a position of the intermediate image.

According to the image display device of the second aspect, it is possible to perform the diopter adjustment of the position of the depth direction of the virtual image (diopter adjustment of virtual image) through a simple configuration in which the position of the intermediate image is changed. Further, it is possible to also perform the diopter adjustment with respect to the external light.

In the second aspect described above, the intermediate image position changing means may integrally move the image generating unit and at least a part of the first optical system in the direction of the central light beam of the image light.

According to the configuration, it is possible to easily and surely change the position of the intermediate image.

In the second aspect described above, the intermediate image position changing means may move at least a part of the first optical system in the direction of the central light beam of the image light.

According to the configuration, since the intermediate image position changing means moves at least a part of the first optical system, a configuration of the device is simplified and miniaturized. Accordingly, the entire device can be miniaturized.

In the second aspect described above, the diopter scale adjusting means may include a lens which includes an external light side surface of the second optical system and the eye side surface of the viewer.

According to the configuration, the diopter scale adjusting means can be used together the second optical system. Accordingly, the number of components thereof can be reduced, and reduction in size of the device can be realized.

In the second aspect described above, the diopter scale adjusting means may include an eyeglass lens which is disposed between the second optical system and the eye of the viewer.

According to the configuration, since an eyeglass lens is used, it is possible to miniaturize the device and easily performs the diopter adjustment of the external light.

In the second aspect described above, the intermediate image position changing means may adjust a position of the virtual image in a depth direction according to the diopter adjustment of the external light using the diopter scale adjusting means.

According to the configuration, since the diopter scale with respect to the external light and the virtual image is adjusted to be well-balanced, it is possible to provide the image display device excellent in visibility.

DESCRIPTION OF EMBODIMENTS

Hereinafter, embodiments will be described in detail with reference to drawings.

Also, there are cases in which a part to be a feature for the sake of convenience in drawings to be used in following description is enlarged and illustrated in order to easily understand features thereof, and a dimensional ratio of each component is not necessary to be the same as that of the actual.

Hereinafter, an embodiment will be described in detail with respect to drawings.

The image display device of the present embodiment is an example of a head mounted display which a user wears on his or her head to use.

In the following description, a head mounted display will be shortened to HMD.

Figure 1:
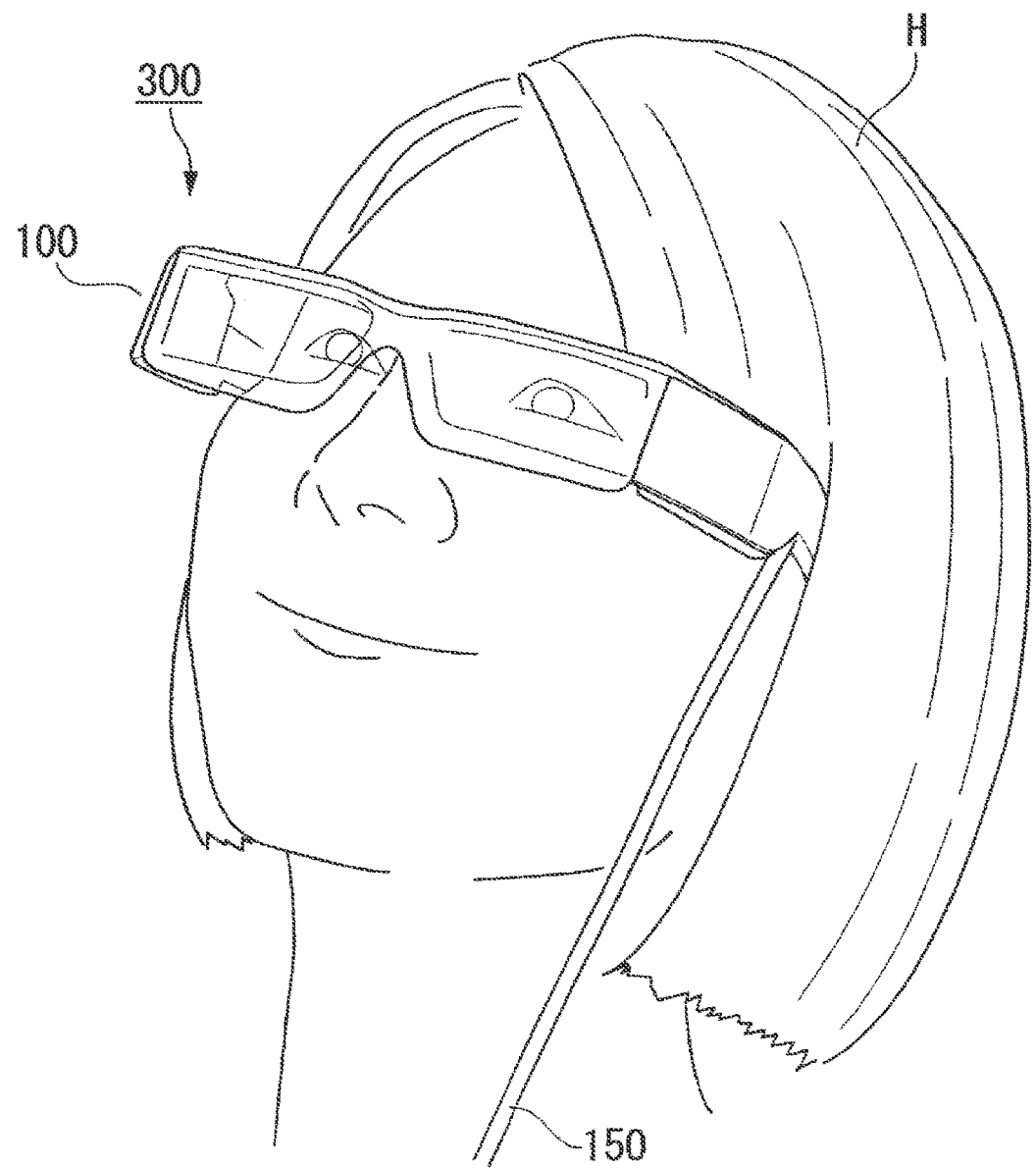
FIG. 1 is a view illustrating a state in which a HMD of a first embodiment is worn.

FIG. 1 is a view illustrating a state in which the user wears the HMD of the present embodiment.

Figure 2:
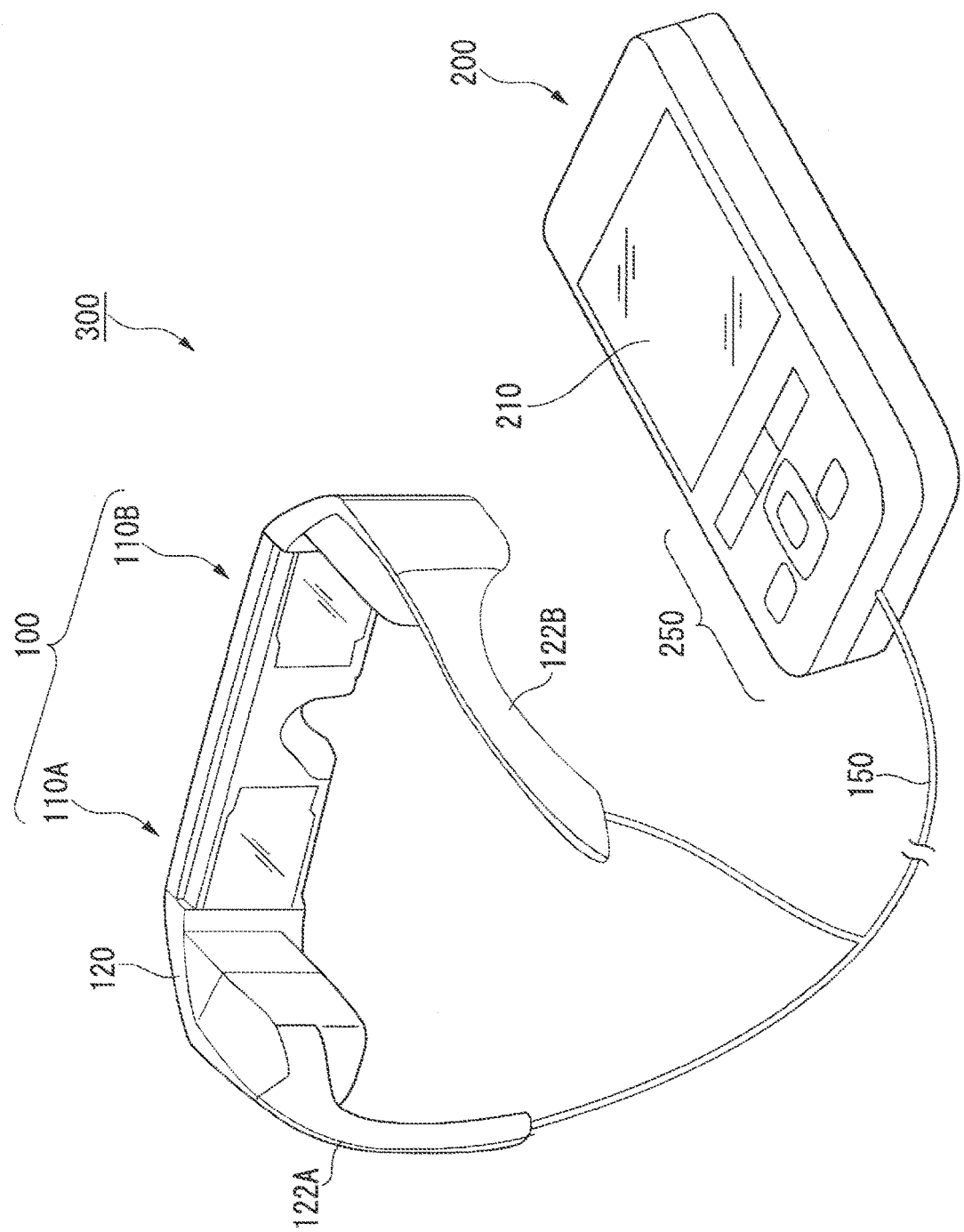
FIG. 2 is a perspective view of the HMD of the embodiment.

FIG. 2 is a perspective view of the HMD of the present embodiment.

As illustrated in FIG. 1, an HMD 300 of the present embodiment is worn on a head portion and used by the user with the feeling of wearing eyeglasses. The HMD 300 of the present embodiment is a see-through type (transmitting type) HMD. According to the HMD 300 of the present embodiment, the user is capable of visually recognizing an image which is generated by an image display unit, and is also capable of visually recognizing an image of the outdoor scenes such as the scenery which is external to the HMD 300.

As illustrated in FIG. 2, the HMD 300 is provided with a display device 100 which has a shape which is similar to eyeglasses, and a control device (controller) 200 which has a size of a degree a user may hold using a hand of the user. The display device 100 and the control device 200 are connected in a wired or a wireless manner to be capable of communication. In the present embodiment, each of a left eye image display unit 110A and a right eye image display unit 110B which form the display device 100, and the control device 200 are connected in a wired manner via a cable 150 to be capable of communication, and communicate image signals, control signals, and the like.

The display device 100 is provided with a main frame 120, the left eye image display unit 110A, and the right eye image display unit 110B. The control device 200 is provided with a display unit 210, and an operation button unit 250. The display unit 210 displays various information, instructions, and the like to be provided to the user, for example. A main frame 120 is provided with a pair of temple portions 122A and 122B for the user to wear on the ears of the user. The main frame 120 is a member which supports the left eye image display unit 110A and the right eye image display unit 110B.

Figure 3:
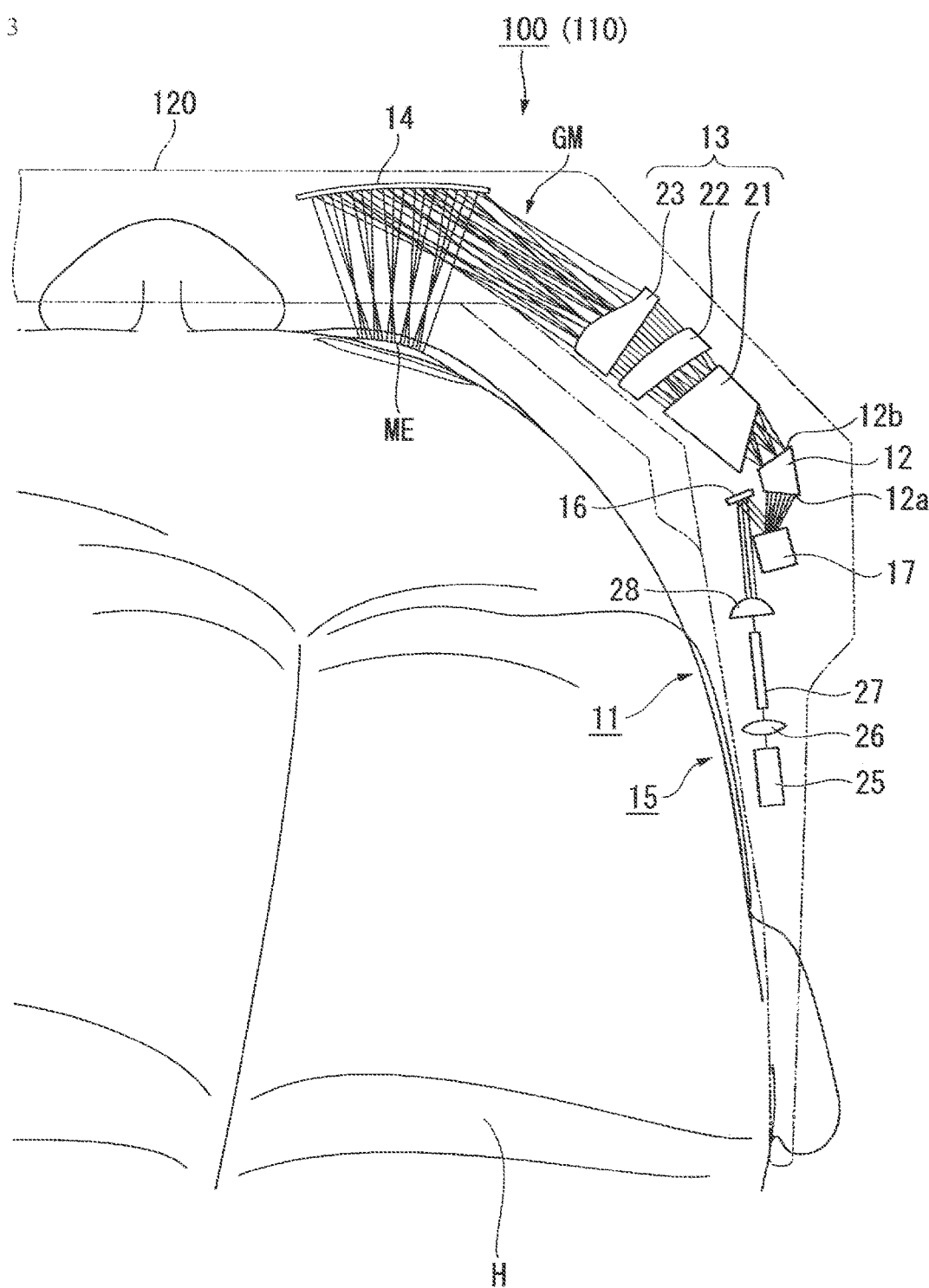
FIG. 3 is a plan view illustrating a configuration of each part of a display device.

FIG. 3 is a plan view illustrating the configuration of the portions of the display device 100. FIG. 3 illustrates a state of the user wearing the display device 100 as viewed from above the head.

The right eye image display unit 110B and the left eye image display unit 110A have the same configuration, and the configuration elements inside both the image display units are disposed to be left-right symmetrical. Therefore, hereinafter, detailed description will be given of the right eye image display unit 110B simply as the image display unit 110, and description of the left eye image display unit 110A will be omitted.

As illustrated in FIG. 3, the image display unit 110 is provided with an image generating unit 11, a pupil expanding element 12, a first optical system 13, and a second optical system 14. The image generating unit 11 emits light which includes image information. The pupil expanding element 12 expands a beam diameter of the light which is emitted from a light scanning device 17 to be described later.

The image generating unit 11 is provided with a light source optical system 15, a mirror 16, and the light scanning device 17. The light source optical system 15 emits light which is generated by an internal semiconductor laser. The mirror 16 reflects the light which is emitted from the light source optical system 15 and turns back the optical path of the light. The light scanning device 17 scans the light which is reflected by the mirror 16.

The light source optical system 15 is provided with a light source unit 25, a pickup lens 26, an optical fiber 27, and a collimator lens 28. For example, the light source unit 25 is provided with a plurality of solid state light sources (not illustrated) including a semiconductor laser which emits red light, a semiconductor laser which emits green light, and a semiconductor laser which emits blue light. The colors of light which are emitted from the semiconductor lasers are modulated according to the image signal, the colors of light which are modulated are combined, and are emitted from the light source unit 25 as image light. The pickup lens 26 transmits the light which is emitted from the light source unit 25 to the optical fiber 27 of a later stage. The optical fiber 27 guides the light, which passes from the light source unit 25, through the pickup lens 26, and is incident on the optical fiber 27, to an optical system of a later stage. A collimator lens 28 parallelizes the light which is incident from the optical fiber 27.

The optical path of the light which is emitted from the light source optical system 15 is turned back due to the light being reflected by the mirror 16, and the light is guided to the light scanning device 17. The light scanning device 17 is provided with an MEMS mirror (not illustrated), for example. The light scanning device 17 causes the posture of the MEMS mirror to change in accordance with a modulation operation of the light source optical system 15, and scans light two-dimensionally. In this manner, the light scanning device 17 emits image light which includes image information.

Light emitted from the light source optical system 15 is parallelized by the collimator lens 28 so as to be parallel light. The parallelized light has a changed angle due to the MEMS mirror 18 of the light scanning device 17 so as to constitute the image light. The image light in which the angle is changed due to the MEMS mirror 18 is incident on the pupil expanding element 12.

Generally, if a size of a pupil of an eye of a viewer, movement of an eyeball, individual differences of a width of eyes, or the like is considered, it is thought that a size of an exit pupil is required to be approximately 6 mm to 8 mm. In the HMD 300 of the present embodiment, the light (image light) from the MEMS mirror 18 is magnified up to 6 mm or more by the pupil expanding element 12. Accordingly, even when a pupil position of the viewer H deviates somewhat, a virtual image G1 can be clearly visually recognized, and thus the HMD is significantly excellent in use.

The pupil expanding element 12 includes a plurality of parallel plane plates (not illustrated) and a plurality of half mirrors (not illustrated). The plurality of parallel plane plates are bonded to each other through the half mirror. The pupil expanding element 12 is cut, such that a pair of end surfaces thereof is inclined with respect to a thickness direction of the parallel plane plates, and the end surfaces respectively constitute a light entrance end surface 12*a* on which the image light from the light scanning device 17 is incident, and a light exit end surface 12*b* where the image light is magnified and emitted. In this manner, a shape of a horizontal section of the pupil expanding element 12 is a trapezoidal shape.

In the pupil expanding element 12, the image light incident from the light entrance end surface 12*a* is repeatedly transmitted to and reflected by the plurality of half mirrors, and then is emitted from the light exit end surface 12*b*. A width of the image light emitted from the light exit end surface 12*b* is magnified with respect to a width of the image light incident on the light entrance end surface 12*a*. In addition, an incident angle of the image light on the light entrance end surface 12*a* and an emission angle of the image light from the light exit end surface 12*b* are matched with each other.

Accordingly, for example, the image light which is vertically incident on the light entrance end surface 12*a* is vertically emitted from the light exit end surface 12*b*, and the image light which is incident on the light entrance end surface 12*a* at a predetermined incident angle is emitted from the light exit end surface 12*b* at an emission angle which is the same as the incident angle. Accordingly, in FIG. 3, when the image light is transmitted to the pupil expanding element 12, an optical path is bent to a short side of the trapezoidal shape.

The first optical system 13 functions as a correction optical system for correcting aberration or distortion of an image which is caused and generated by the second optical system 14 when light emitted from the pupil expanding element 12 is incident. The first optical system 13 is an optical system including at least positive power and negative power, and totally includes the positive power. In the present embodiment, the first optical system 13 includes a first lens 21, a second lens 22, and a third lens 23 in order from a light incident side. Also, in the present embodiment, the first optical system 13 is configured with three lenses of the first lens 21, the second lens 22, and the third lens 23, but the number of correction lenses is not particularly limited.

Based on such a configuration, since the first optical system 13 totally includes the positive power, light emitted from the pupil expanding element 12 is condensed, and an intermediate image GM can be formed in front of the second optical system 14.

Figure 4:
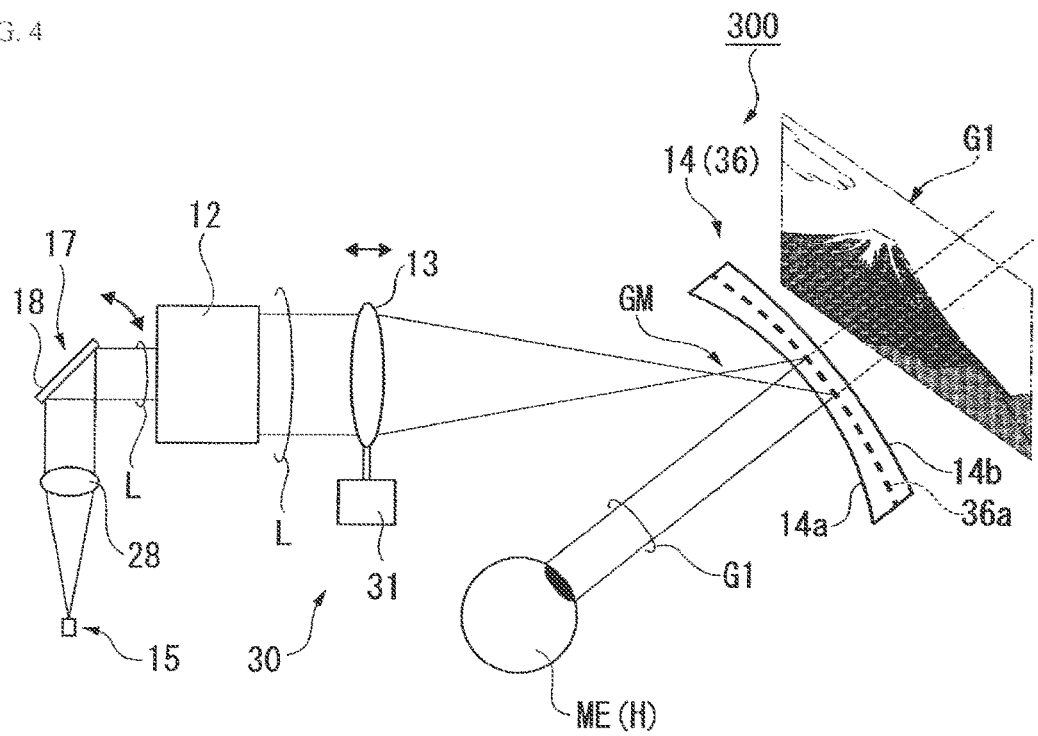
FIG. 4 is a view in which a configuration of the HMD is schematized.

FIG. 4 is a perspective view of a configuration of the HMD 300 of the present embodiment. Also, in FIG. 4, the first optical system 13 is illustrated as one lens in order to easily see the drawing.

As illustrated in FIG. 4, the second optical system 14 reflects the light from the intermediate image GM, guides the virtual image G1 to the eye ME of the viewer H, and transmits a part of external light. As the second optical system 14, for example, a concave mirror on which a translucent film is vapor-deposited, a Fresnel concave mirror, a mirror in which a reflective hologram is formed on an aspherical surface, and the like are used. The second optical system 14 of the present embodiment includes, for example, a structure in which a translucent concave mirror (reflective surface) 36*a* is provided in the middle of a lens 36 (transparent plastic) formed with an eye side surface 14*a* and an external light side surface 14*b*.

However, eyesight of the viewer using the HMD varies from person to person. For example, in a case in which a viewer who has eyesight other than normal eyesight such as near-sightedness or astigmatism uses the HMD, diopter adjustment with respect to external light and a virtual image is required to be performed in order to obtain clear image visibility.

The HMD 300 of the present embodiment is capable of easily performing the diopter adjustment with respect to external light and a virtual image to be described later.

The HMD 300 of the present embodiment is provided with diopter scale adjusting means 35 which adjusts a diopter scale with respect to external light. The diopter scale adjusting means 35 is configured with the lens 36 which is constituted by the eye side surface 14*a* and the external light side surface 14*b* of the second optical system 14. The lens 36 constitutes the diopter scale adjusting means disclosed in claims which adjusts the diopter scale with respect to the external light by adjusting a shape according to the eyesight of the viewer.

Hereinafter, a method of determining a shape of the lens 36 will be described.

First, arrangements, refractive indexes, shapes of the first optical system 13 and the second optical system 14 are determined so as to be reduce aberration of the virtual image G1. At this time, the shape of the second optical system 14 (lens 36) is generally a free-form surface, and thus the aberration can be corrected better. After a shape of each curved surface of the eye side surface 14*a* and a concave mirror 37 is determined, a curved surface shape of the external light side surface 14*b* is determined so as to be capable of correcting the diopter scale as needed.

For example, an amount of the diopter adjustment of the external light with respect to the viewer H having a general eyesight may be set to zero. That is, the shapes of the eye side surface 14*a* and the external light side surface 14*b* are adjusted so as not to have refractive power with respect to the external light. That is, an average curvature radius of the eye side surface 14a is a value slightly greater than then an average curvature radius of the external light side surface 14b.

In addition, with respect to the near-sighted viewer H, the lens 36 may be used, in which the average curvature radius of the external light side surface 14b is a value greater than the average curvature radius of the eye side surface 14a, which totally includes negative power.

In addition, with respect to the long-sighted viewer H, the lens 36 may be used, in which the average curvature radius of the external light side surface 14b is a value smaller than the average curvature radius of the eye side surface 14a, which totally includes positive power. Also, as the lens 36, a bifocal lens as a progressive focus lens can be also used. The diopter adjustment of external light can be independently performed from a diopter scale or a position of the virtual image G1 to be described later.

In addition, the lens 36 (second optical system 14) can be detachable from a main frame 120 (refer to FIG. 3). Therefore, a lens is exchanged to the lens 36 in accordance with the eyesight, and thus each of the viewers H having various eyesight can clearly see the external light.

In addition, the HMD 300 of the present embodiment is provided with intermediate image position changing means 30 which adjusts a position of the virtual image G1 in a depth direction by changing a position of the intermediate image GM and adjusts the diopter scale with respect to the virtual image G1. The intermediate image position changing means 30 is provided with a moving device 31 which moves the first optical system 13 in a direction of a central light beam of the light emitted from the pupil expanding element 12 (image light L).

As the moving device 31, for example, it is possible to exemplify that the first optical system 13 is moved by using screws and eccentric pins according to guiding or the first optical system 13 is automatically moved using a motor, an actuator, or the like.

In the present embodiment, the first optical system 13 is configured with a plurality of the lenses (first lens 21, second lens 22, and third lens 23). The intermediate image position changing means 30 may move the entirety of the first optical system 13 (three lenses), and may move only one of the three lenses.

Hereinafter, a diopter adjustment function with respect to the virtual image G1 will be described.

First, a case in which the diopter adjustment of the virtual image with respect to the near-sighted viewer H is performed will be described. Also, the diopter adjustment of the virtual image is performed in accordance with the diopter adjustment of the external light due to the diopter scale adjusting means 35. That is, in a case in which position adjustment of the virtual image corresponding to the near-sighted viewer H is performed, the lens 36 for near-sightedness described above corresponding to the near-sighted viewer H may be used.

Figure 5:
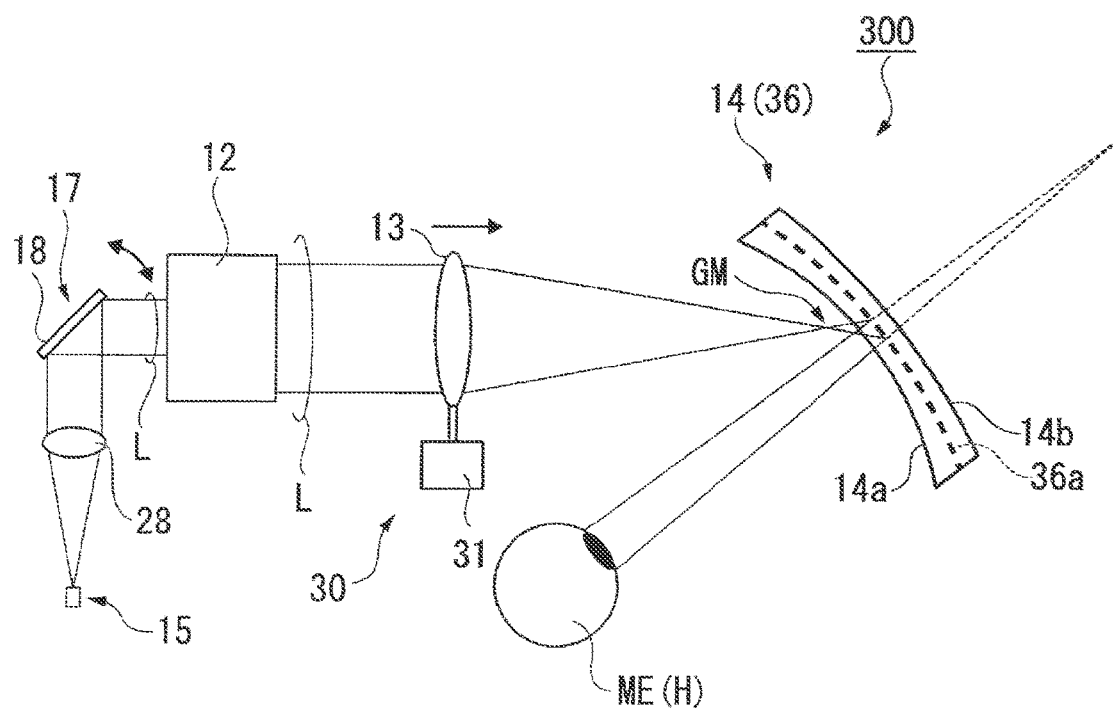
FIG. 5 is a view illustrating a case in which diopter adjustment is performed on a near-sighted viewer.

FIG. 5 is a view describing a case in which the diopter adjustment with respect to the near-sighted viewer H is performed. Also, FIG. 4 illustrates only a light flux of the center of an image (virtual image G1).

As illustrated in FIG. 5, the moving device 31 moves the first optical system 13 to be close to the second optical system 14 side. Accordingly, a position of the intermediate image GM is close to the second optical system 14. Accordingly, the light from the intermediate image GM reflected by the second optical system 14 becomes divergent light. Divergent light L1 is imaged on a retina of the near-sighted viewer H. Also, in a case in which a viewer wants to move the position of the virtual image G1 closer to the front of the viewer, the moving device 31 may move the first optical system 13 to be closer to the second optical system 14.

Subsequently, a case in which the diopter adjustment with respect to the long-sighted viewer H is performed. Also, the diopter adjustment of the virtual image is performed in accordance with the diopter adjustment of the external light by the diopter scale adjusting means 35. That is, in a case in which the position adjustment of the virtual image corresponding to the long-sighted viewer H is performed, the lens 36 for long-sightedness described above corresponding to the long-sighted viewer H may be used.

Figure 6:
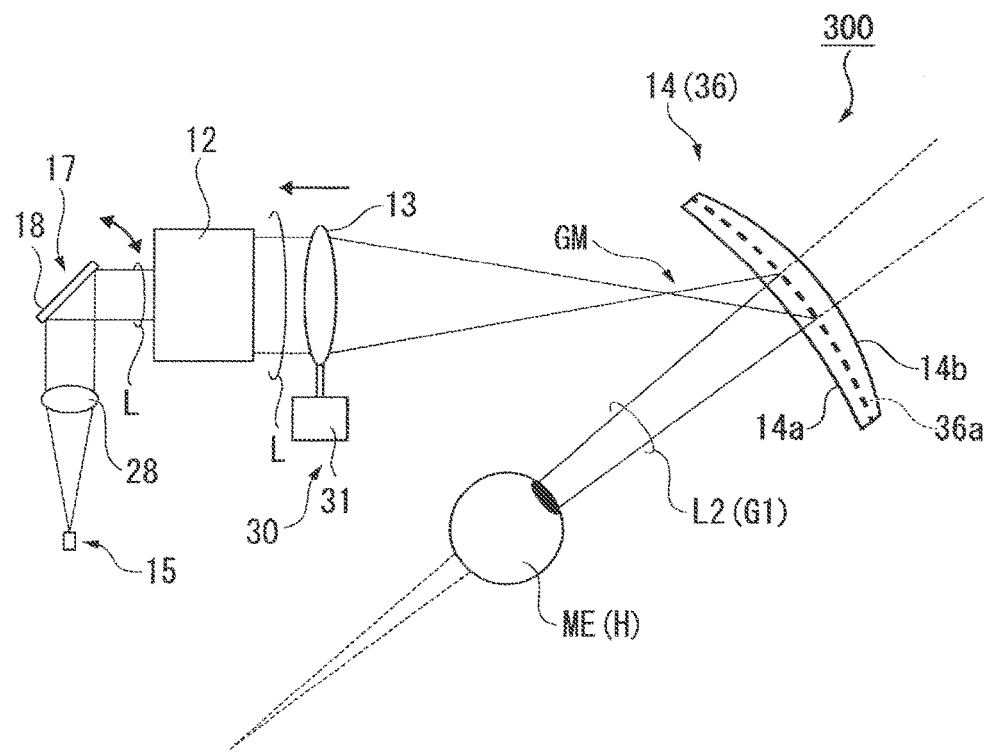
FIG. 6 is a view illustrating a case in which diopter adjustment is performed on a long-sighted viewer.

FIG. 6 is a view describing a case in which the diopter adjustment with respect to the long-sighted viewer H is performed. Also, FIG. 6 illustrates only a light flux of the center of the image (virtual image G1).

As illustrated in FIG. 6, the moving device 31 moves the first optical system 13 to be distant from the second optical system 14. Accordingly, the position of the intermediate image GM is distant from the second optical system 14. Accordingly, the light from the intermediate image GM reflected by the second optical system 14 becomes convergent light L2. The convergent light L2 is imaged on a retina of the long-sighted viewer H.

Also, the intermediate image position changing means 30 may adjust the position of the depth direction of the virtual image G1 with respect to the viewer H having general eyesight. In this case, for example, at the time of making the position of the virtual image G1 be close to a front in the depth direction, as illustrated in FIG. 5, it is good if the intermediate image GM is close to the second optical system 14. Otherwise, in order to make the position of the virtual image G1 be distant from the depth direction, as illustrated in FIG. 6, it is good if the intermediate image GM is distant from the second optical system 14.

As described above, according to the HMD 300 of the present embodiment, the position of the depth direction of the virtual image G1 can be adjusted (diopter adjustment of virtual image) through a simple configuration in which the position of the intermediate image GM is changed using the intermediate image position changing means 30. In addition, since the diopter scale adjusting means 35 is provided, the diopter adjustment with respect to the external light can be performed. Accordingly, the diopter scale with respect to the external light and the virtual image is adjusted to be well-balanced, and thereby making it possible to provide the HMD 300 excellent in visibility.

Second Embodiment

Subsequently, a second embodiment will be described. The present embodiment and the first embodiment are different from in a point of structures of an image generation unit and the intermediate image position changing means, but the other configurations except the point are common to each other, and thus the same numeral is given to the common component and detailed description thereof will be omitted.

Figure 7:
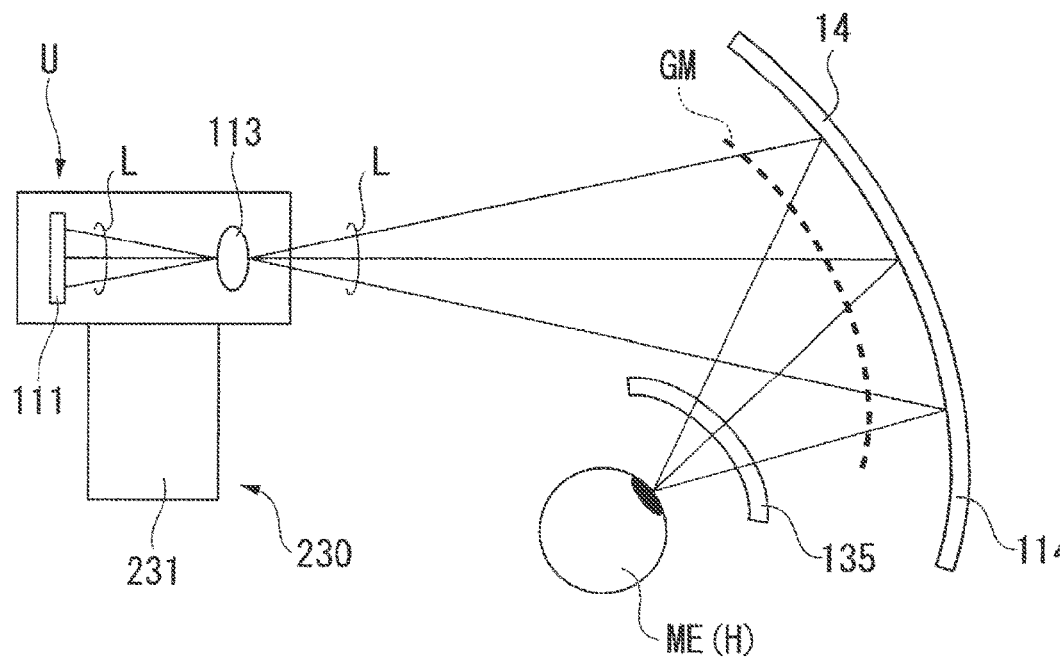
FIG. 7 is a view illustrating a schematic configuration in a HMD of a second embodiment.

FIG. 7 is a view illustrating a schematic configuration in a HMD 301 of the present embodiment. Also, FIG. 7 illustrates only central light beams of viewing angles of the center and both ends of the image (virtual image).

The HMD 301 of the present embodiment includes an image generating unit 111, a lens (first optical system) 113, a second optical system 114, intermediate image position changing means 230, and diopter scale adjusting means 135.

The image generating unit 111 of the present embodiment is configured with a display panel (electro-optical device) 112.

The display panel 112 includes a backlight (not illustrated) and a light modulation element (not illustrated). The backlight is configured with, for example, a set of light sources of each of light emission color such as red, green, and blue. As each light source, for example, a light emitting diode (LED), a laser light source, or the like can be used. As the light modulation element, for example, a liquid crystal display which is a display element or the like can be used. In addition, as the display panel 112, an organic electroluminescence device (organic EL device) or the like can also be adopted.

The lens 113 includes the positive power, condenses the light emitted from the display panel 112, and forms the intermediate image GM in front of the second optical system 114. The second optical system 114 is configured with the concave mirror which reflects the light from the intermediate image GM, guides the virtual image G1 to the eyes of the viewer H, and transmits a part of the external light. In the present embodiment, the image generating unit 111 and the lens 113 constitute an image unit U by being integrated with each other.

The intermediate image position changing means 230 is provided with a moving device 231 which moves the image unit U in the direction (right and left direction in FIG. 7) of the central light beam of the light (image light L) emitted from the image unit U.

Also, the lens 113 may be configured with a plurality of lenses in the same manner as the first embodiment. In this case, the image unit U may includes at least one among the plurality of lenses, and the intermediate image position changing means 230 may move only the lens (a part of lens 113) included in the image unit U.

In the HMD 301 of the present embodiment, the diopter scale adjusting means 135 performs the diopter adjustment with respect to the external light. The diopter scale adjusting means 135 is configured with an eyeglasses lens (inner lens). The diopter scale adjusting means 135 is positioned to be avoid a light path of the image light from the lens 113 to the second optical system 114 and is disposed to be detachably between the second optical system 114 and the eyes of viewer H, by being supported using a supporting member, which is not illustrated, provided in the main frame 120. Also, visibility of the external light in the viewer H having various eyesight can be improved by exchanging a lens to the diopter scale adjusting means 135 (eyeglasses lens) corresponding to eyesight of the viewer H.

In addition, in the HMD 301 of the present embodiment, the position of the intermediate image GM is changed by moving the image unit U in a light axis direction of the image light, and the diopter adjustment of the virtual image G1 and the position adjustment of virtual image G1 together can be easily and surely performed with the diopter scale adjusting means 135 (eyeglasses lens).

According to the HMD 301 of the present embodiment, the position adjustment of the depth direction of the virtual image G1 (diopter adjustment of virtual image) can be performed through the simple configuration in which the intermediate image position changing means 230 changes the position of the intermediate image GM. In addition, since the diopter scale adjusting means 135 is provided, the diopter adjustment with respect to the external light can be performed. Accordingly, the diopter scale with respect to the external light and the virtual image is adjusted to be well-balanced, and thereby making it possible to provide the HMD 300 excellent in visibility.

Also, a technical scope of the disclosure is not limited to the embodiments described above, and it is possible to add various modifications without departing from the gist of the disclosure.

For example, in the embodiment described above, the HMDs 300 and 301 which are respectively provided with the intermediate image position changing means 30 and 120 and the diopter scale adjusting means 35 and 135 are described as an example, but the disclosure is not limited thereto. The HMD of the embodiment may be provided with at least only the intermediate image position changing means 30 and 120, and according to this, the position adjustment of the depth direction of the virtual image G1 can be performed through the simple configuration in which the position of the intermediate image GM is changed.

In addition, in the embodiment described above, a case, in which the position of the intermediate image GM is changed by moving the first optical system 13 and the lens 113 and the position of the depth direction of the virtual image G1 is adjusted, is described as an example, but the disclosure is not limited thereto, and the position of the intermediate image GM may be changed by moving the second optical systems 14 and 114.

However, an optimum position in the depth direction of the virtual image varies in a case in which a viewer sees a distant landscape (external light) and in a case in which the viewer sees a nearby landscape (external light). That is, if the position of the depth direction of the virtual image deviates from the optimum position, the viewer feels uncomfortable at the time of visually recognizing the external light and the virtual image at the same time.

According to that, the intermediate image position changing means 30 and 230 may adjust, for example, the position of the depth direction of the virtual image G1 according to the external light that the viewer H is visually recognized.

In this case, using detecting means detecting the external light that the viewer H is visually recognized (for example, CCD camera or the like), the position of the intermediate image GM may be changed by controlling the intermediate image position changing means 30 and 230 based on a detected result of the detection means.

According to this, the position in the depth direction of the virtual image can be optimized in a case in which a viewer sees a distant landscape (external light) and in a case in which the viewer sees a nearby landscape (external light). Accordingly, even when the viewer moves his or her sight line from the distant landscape to the nearby landscape at the time of seeing the external light (landscape) and the virtual image at the same time, the position of the depth direction of the virtual image is adjusted to be an optimum position according to movement of the sight line, and thereby making it possible to obtain clear image visibility without feeling uncomfortable.

REFERENCE SIGNS LIST

H viewer
ME eye
G1 virtual image
L image light
MG intermediate image
11, 111 image generating unit
12 pupil expanding element (expanding element)
13 first optical system
14, 114 second optical system 17 light scanning device
30, 230 intermediate image position changing means
35, 135 diopter scale adjusting means
36 lens
112 display panel (electro-optical device)
300,301 HMD (image display device)

The invention claimed is:

1. An image display device comprising:
an image generating unit that emits image light including image information;
a first optical system that condenses the image light and forms an intermediate image;
a second optical system that guides a virtual image to an eye of a viewer by deflecting light from the intermediate image, and guides the light to the eye of the viewer by transmitting external light; and
a moving device that adjusts a position of the virtual image in a depth direction of the eye of the viewer by changing a position of the intermediate image,
wherein the image generating unit includes a light scanning device which scans light emitted from a light source unit, and an expanding element which expands the light from the light scanning device and emits the light as the image light, and
wherein the moving device moves at least a part of the first optical system in a direction of a central light beam of the image light.

2. An image display device comprising:
an image generating unit that emits image light including image information;
a first optical system that condenses the image light and forms an intermediate image;
a second optical system that guides a virtual image to an eye of a viewer by deflecting light from the intermediate image, and guides the light to the eye of the viewer by transmitting external light; and
a moving device that adjusts a position of the virtual image in a depth direction of the eye of the viewer by changing a position of the intermediate image,
wherein the image generating unit includes an electro-optical device which generates the image light, and
wherein the moving device moves at least a part of the first optical system in the direction of the central light beam of the image light.

3. An image display device comprising:
an image generating unit that emits image light including image information;
a first optical system that condenses the image light and forms an intermediate image;
a second optical system that guides a virtual image to an eye of a viewer by deflecting light from the intermediate image, and guides the light to the eye of the viewer by transmitting external light;
a diopter scale adjusting lens that adjusts a diopter scale with respect to the external light; and
a moving device that adjusts a position of the virtual image in a depth direction of the eye of the viewer by changing a position of the intermediate image,
wherein the moving device integrally moves the image generating unit and at least a part of the first optical system in the direction of the central light beam of the image light.

4. The image display device according to claim 3,
wherein the diopter scale adjusting lens includes a lens which includes an external light side surface of the second optical system and the eye side surface of the viewer.

5. The image display device according to claim 3,
wherein the diopter scale adjusting lens includes an eyeglass lens which is disposed between the second optical system and the eye of the viewer.

6. The image display device according to claim 3,
wherein the moving device adjusts a position of the virtual image in a depth direction according to the diopter adjustment of the external light using the diopter scale adjusting lens.

7. The image display device according to claim 3,
wherein the image generating unit includes a light scanning device which scans light emitted from a light source unit and an expanding element which expands light from the light scanning device and emits the light as the image light.

8. The image display device according to claim 3,
wherein the image generating unit includes an electro-optical device which generates the image light.

9. An image display device comprising:
an image generating unit that emits image light including image information;
a first optical system that condenses the image light and forms an intermediate image;
a second optical system that guides a virtual image to an eye of a viewer by deflecting light from the intermediate image, and guides the light to the eye of the viewer by transmitting external light;
a diopter scale adjusting lens that adjusts a diopter scale with respect to the external light; and
a moving device that adjusts a position of the virtual image in a depth direction of the eye of the viewer by changing a position of the intermediate image,
wherein the moving device moves at least a part of the first optical system in the direction of the central light beam of the image light.

10. The image display device according to claim 9,
wherein the diopter scale adjusting lens includes a lens which includes an external light side surface of the second optical system and the eye side surface of the viewer.

11. The image display device according to claim 9,
wherein the diopter scale adjusting lens includes an eyeglass lens which is disposed between the second optical system and the eye of the viewer.

12. The image display device according to claim 9,
wherein the moving device adjusts a position of the virtual image in a depth direction according to the diopter adjustment of the external light using the diopter scale adjusting lens.

13. The image display device according to claim 9,
wherein the image generating unit includes a light scanning device which scans light emitted from a light source unit and an expanding element which expands light from the light scanning device and emits the light as the image light.

14. The image display device according to claim 9,
wherein the image generating unit includes an electro-optical device which generates the image light.

* * * * *